United States Patent [19]

Takahara et al.

[11] Patent Number: 4,601,588

[45] Date of Patent: Jul. 22, 1986

[54] TEMPERATURE-INDICATING SHEET

[75] Inventors: Ichiro Takahara, Yao; Tomoyoshi Ono, Osaka; Makoto Nakai, Kashihara, all of Japan

[73] Assignee: Matsumoto Kosan Kabushiki Kaisha, Japan

[21] Appl. No.: 776,217

[22] Filed: Sep. 16, 1985

Related U.S. Application Data

[63] Continuation-in-part of Ser. No. 646,990, Sep. 4, 1984, abandoned.

[30] Foreign Application Priority Data

Sep. 5, 1983 [JP] Japan .................. 58-163754
Mar. 10, 1984 [JP] Japan .................. 59-45985

[51] Int. Cl.$^4$ .......................................... G01K 11/12
[52] U.S. Cl. ..................... 374/106; 374/162; 116/207
[58] Field of Search ............... 374/102, 104, 106, 160, 374/162; 116/207; 426/88

[56] References Cited

U.S. PATENT DOCUMENTS

| | | | |
|---|---|---|---|
| 3,465,590 | 9/1969 | Kluth | 374/162 |
| 3,617,374 | 11/1971 | Hodson | 374/162 |
| 3,620,889 | 11/1971 | Baltzer | 374/162 |
| 3,695,903 | 10/1972 | Telkes et al. | 374/162 |
| 3,774,450 | 11/1973 | Godsey | 374/106 |
| 3,874,240 | 4/1975 | Rembaum | 374/162 |
| 3,967,579 | 7/1976 | Seiter | 374/106 |
| 4,154,107 | 5/1979 | Giezen et al. | 116/207 |
| 4,407,960 | 10/1983 | Tratnyer | 116/207 |
| 4,450,023 | 5/1984 | DeBlauwe | 116/207 |

Primary Examiner—Charles Frankfort
Assistant Examiner—Thomas B. Will
Attorney, Agent, or Firm—Ostrolenk, Faber, Gerb & Soffen

[57] ABSTRACT

The present invention provides a temperature-indicating sheet which, when exposed to temperatures higher than the prescribed temperature in temperature-control for the common low-temperature preserved goods, changes in color according to the exposure temperature and time. This object is attained by arranging one component which melts at the prescribed temperature and a substance which irreversibly changes in color in contact with said component through a membrane permeable to the component. The sheet of the present invention comprises a component which melts at the prescribed temperature, a substance which changes in color in contact with the component and a membrane permeable to the molten component, said component being included in microcapsules which can be broken by outer pressure at a temperature used, and in which the component and the substance are arranged at the opposite sides with respect to the membrane.

3 Claims, 10 Drawing Figures

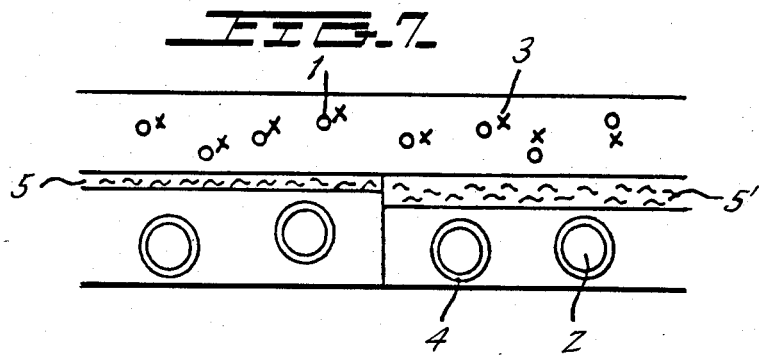
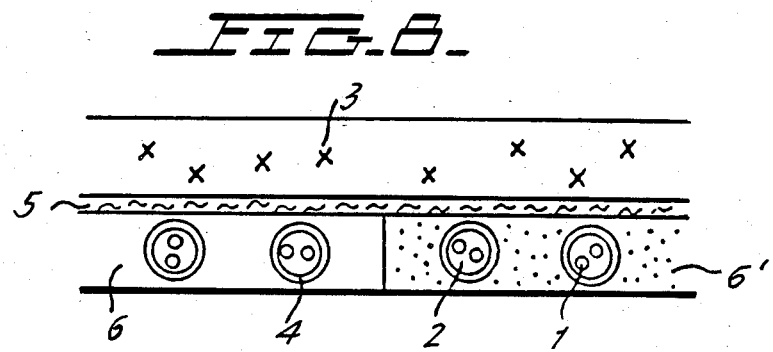
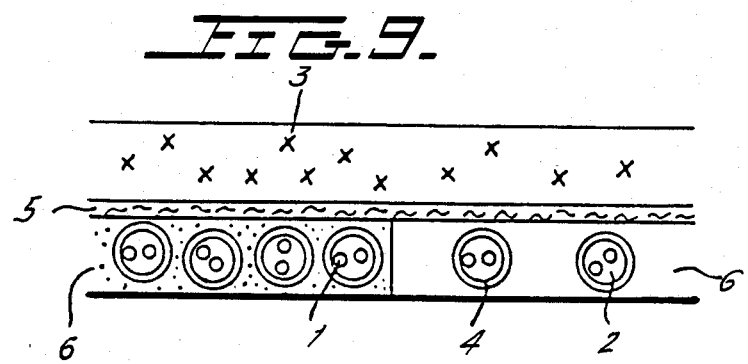
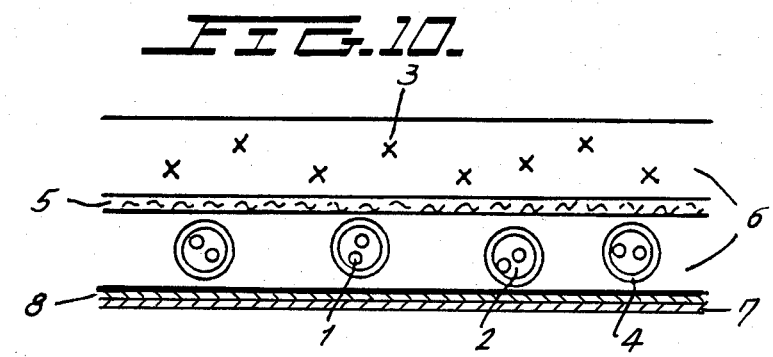

TEMPERATURE-INDICATING SHEET

This is a continuation-in-part of application Ser. No. 646,990, filed Sept. 4, 1984, now abandoned.

BACKGROUND OF THE INVENTION

Low-temperature preserved goods such as frozen foods, etc. are generally denatured when once exposed to environments higher than the prescribed temperature, but there are cases wherein, when the denatured goods are again preserved at low temperatures, it becomes impossible to distinguish them from the undenatured goods by appearance. For previously checking the denaturation of low-temperature preserved goods which results from insufficient control on the marketing route, and supplying undenatured goods to consumers without anxiety, it is necessary that one can easily be judged that the goods have not been exposed on the way to temperatures higher than the prescribed one can easily be judged.

An object of the present invention is to provide a temperature-indicating apparatus for attaining the above purpose. More particularly, said object is to provide a temperature-indicating sheet which can be stuck directly on low-temperature preserved goods or can be inserted into or stuck on the package, and which, when the goods are exposed to temperatures higher than the prescribed one, can change in color according to the exposure temperature and time.

The thermochromic materials so far used include metal complex crystals and liquid crystals. These materials, however, are limited in the range of discoloration temperature and the kind of color, so that thermochromic compositions comprising organic electron-donative color precursor, electron-accepting organic compounds and alcohols, ester, etc., or those comprising organic electron-accepting color precursor, electron-donative organo-nitrogen compounds and alcohols, esters, etc., have been proposed for said materials. With these compositions, it is possible to freely select the discoloration temperature and the kind of color over a wide temperature range of from $-100°$ C. to more than $200°$ C. But, these compositions do not come to provide such compositions which will color in change according to both the temperature and time as intended by the present invention.

Also, in the thermochromic compositions comprising combination of an organic electron-donative color precursor and an electron-accepting organic compound, there are proposed heat-integrating thermochromic compositions in which one of the above components is included in fine capsules, and which, since the fine capsules are broken when heated at a prescribed temperature for a prescribed time, change in color depending upon two factors of the time and temperature. In this case, the discoloration results from break of the fine capsules by heating to temperatures higher than room temperature, so that said compositions cannot be applied to low-temperature preserved goods as intended by the present invention. For temperature-indication at low temperatures, a method to detect the change in shape or color (a dye is used together) on melting of frozen brine, is proposed. In this case, however, the controllable temperature is $0°$ C. or less, and also a change depending upon temperature and time cannot be detected, so that this method is not applicable to the present invention with an object to control common goods to be preserved at low temperatures including $0°$ C. or more.

Temperature-indicating labels changing in color after a definite time has passed at a definite temperature, are also proposed (Japanese Pat. Appln. No. 64352/1983). It is however necessary to produce and store the label at temperatures lower than its discoloration temperature, so that the label is inconvenient in use.

SUMMARY OF THE INVENTION

The present invention provides a temperature-indicating sheet which solves the foregoing problems of the prior arts and which, when exposed to temperatures higher than the prescribed temperature in temperature-control for the common low-temperature preserved goods, changes in color according to the exposure temperature and time. This object is attained by arranging one component which melts at the prescribed temperature and the other component which irreversibly changes in color in contact with said component through a membrane permeable to the both components.

BRIEF EXPLANATION OF THE DRAWING

FIG. 1 to FIG. 10 are typical sectional views of the temperature-indicating sheet of the present invention.

DETAILED DESCRIPTION OF THE INVENTION

The present invention relates to a temperature-indicating sheet.

The fundamental structure of the temperature-indicating sheet of the present invention will be illustrated with reference to FIG. 1 to FIG. 3.

Figure 1:
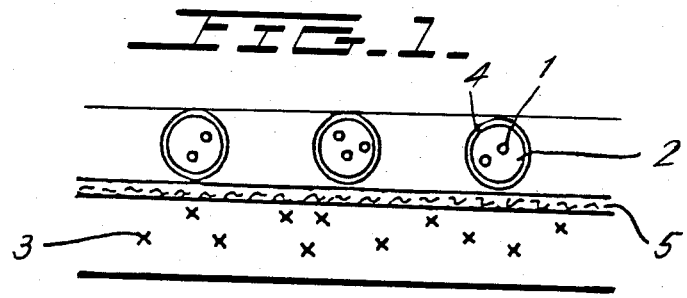

One embodiment of the temperature indicating sheet of the present invention is shown in FIG. 1, (i) an organic electron-donative color precursor (1), (ii) a color developing agent (3) which when in contact with said organic electron-donative color precursor results in a change in color, (iii) a waxy substance (2), (iv) a binder, and (v) a paper or non-woven fabric membrane (5), said waxy substance (2) and color precursor (1) being a mixture included in microcapsules (4) which can be broken by outer pressure at a temperature used, said mixture being adhered to said membrene through said binder at one side of said membrane, the other of said color developing agent (3) being adhered to said membrane (5) at the opposite side, the weight ratio of said microcapsules to said bidner being in the range of from 30:1 to 1:2, and said membrane being permeable to the molten mixture, having a base weight of 20–200 g/m$^2$ and the ratio of said base weight to membrane thickness in microns being not less than 0.3.

In this specification, the waxy substance (2) means a substance which takes a waxy state at a temperature used, i.e. when frozen foods, etc. are preserved at low temperatures with the temperature-indicating sheet stuck thereon, not a substance which takes a waxy state at room temperature.

The waxy substance is in a microencapsulated form, so that it does not come into contact with the color developing agent (3) even though it melts during production and storage at temperatures higher than its melting point.

At using after, pressure is applied by suitable means such as rolling, stamping, etc. to bråke the microcapsule, the sheet is stuck on frozen foods. At that time, since the waxy substance is in a solidified form, it does not discolor the sheet. When the temperature of frozen foods, etc. becomes higher than the prescribed one, the waxy substance melts, flows out of the broken parts of the microcapsules together with color precursor (1) which has been dissolved or dispersed in it, and with the lapse of time, permeates a layer [generally, membrane (5)] to come into contact with the color developing agent (3), as a result of which discoloration is caused.

The sheet of FIG. 1 may be stuck on frozen foods, etc. at either of its upper or lower surface. But, when opaque materials such as paper, etc. are used as the membrane, it is desirable to stick at the upper surface, i.e. a layer containing the component which melts.

Figure 2:
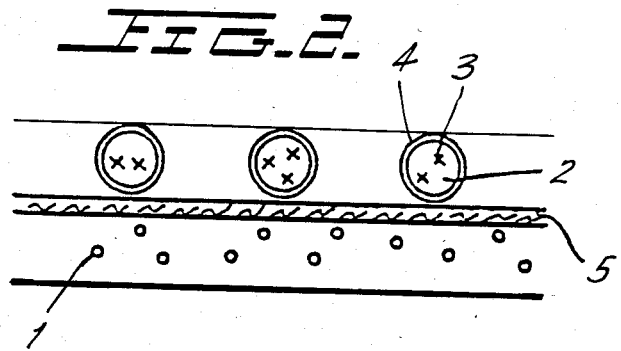

Second embodiment of the temperature indicating sheet of the present invention is shown in FIG. 2, which contains:

(i) an organic electron-donative color precursor (1), (ii) a color developing agent (3) which when in contact with said organic electron-donative color precursor results in a change in color, (iii) a waxy substance (2), (iv) a binder, and (v) a paper or non-woven fabric membrane (5), said waxy substance (2) and color developing agent (3) being a mixture included in microcapsules (4) which can be broken by outer pressure at a temperature used, said mixture being adhered to said membrene through said binder at one side of the membrane, the other of said color precursor (1) being adhered to said membrane (5) at the opposite side, the weight ratio of said microcapsules to said bidner being in the range of from 30:1 to 1:2, and said membrane being permeable to the molten mixture, having a base weight of 20–200 g/m$^2$ and the ratio of said base weight to membrane thickness in microns being not less than 0.3.

At the time of use, the capsules are broken.

In this case, when frozen foods, etc. are kept at temperatures higher than the prescribed one for a definite time, the color developing agent (3) flows out of the capsules and permeates the membrane together with the molten wax to come into contact with the color precursor (1), as a result of which discoloration is caused.

Figure 3:
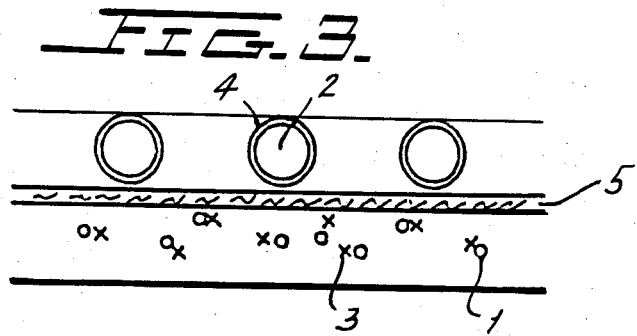

One of third embodiment of the temperature indicating sheet of the present invention (decoloring type) is shown in FIG. 3, which contains (i) a waxy substance (2) containing a component which decolors a colored mixture, which melts at the prescribed temperature, said waxy substance being included in microcapsules (4) which can be broken by outer pressure at a temperature used, (ii) a colored mixture of an organic electron-donative color precursor (1) and a color developing agent excepting inorganic solid acid (3), (iii) a binder, and (iv) a paper or non-woven fabric membrane (5) permeable to molten waxy substance, said microencapsulated waxy substance being adhered to said membrane through said binder at one side of said membrane, and the colored mixture being adhered to the membrane at the other side.

The mixture of the color precorsor (1) and color developing agent (3) has a specific color which will however disappear in contact with the waxy substance [which generally contains a component contributing to decoloration of the above colored product [(1)+(3)], for example alcohols]. In the present invention, the term "discoloration" means also decoloration (disappearance of color) in addition to change in color.

At using, after the microcapsules are broken, the sheet is stuck on frozen foods, and immediately kept at a temperature lower than a prescribed one. On allowing it to stand at a temperature higher than the prescribed one for a definite time, the waxy substance which has melted and flowed out of the broken capsules permeates the membrane with the lapse of time to decolor the color-developed layer.

The present invention includes another third embodiment (color-developing type; not shown by Figure), which is similar to but different from the embodiment shown in FIG. 3 in the mixture of the organic electron-donative color precursor (1) and a color developing agent (2), which are dispersed separately to give a non-colored mixture. When the waxy substance permeates the membrane to contact the color precursor (1) and the color developing agent (2), the color of the temperature indicating sheet changes. In this embodiment the inorganic acid can be used as the color developing agent.

After breaking the microcapsules, the whole system is stored in the range of the prescribed temperature, special change does not occure on said sheet. But, when the system has been exposed to temperatures higher than the melting one of the waxy substance (2), the substance (2) melts, diffuses through the membrane and brings the color precursor (1) contact with the color developing agent (3) to cause irreversible discoloration, from which it can be confirmed that the system has been exposed to temperature higher than the melting one of the waxy substance (2).

In this case, when a period of time during which the system is exposed to temperatures higher than the melting one of the waxy substance (2), is short, even though the waxy substance (2) once melts and begins to diffuse through the membrane, it solidified again before the contact of (1) and (3), and therefore, the discoloration does not cause.

By selecting proper membranes, therefore, a period of time required for the discoloration can be regulated, so that, when the whole system has been exposed to temperatures higher than the prescribed one, discoloration becomes possible according to the temperature and time.

The main object of the present invention is preservation and control of low-temperature preserved goods, and the melting temperature of the waxy substance (2) is considered to be generally less than 20° C. for common uses, particularly preferably about 10° C. Consequently, the microcapsule coated onto the membrane should be broken upon use. Unless, after the microcapsule is broken, the whole system is immediately preserved at the prescribed temperature, the waxy substance (2) melts and begins to diffuse and permeate to discolor the sheet, so that the expected object of the present invention cannot be satisfied.

A typical example of combination of the color precursor (1) and color developing agent (3) used in the present invention is the combination of organic electron-donative color precursor (color precursor) and acids (phenolic hydroxyl group-containing compounds, organic carboxylic acids, inorganic solid acids, etc.)-(color developing agent). The reasons of the above selection are the reliability of discoloration and the clearness.

The organic electron-donative color precursor used in the present invention includes for example diaryl phthalides, polyaryl carbinols, leucoauramines, acylauramines, arylauramines, Rhodamine B lactams, indolines, spiropyrans, fluorans, triphenylmethane derivatives, phenothiazine derivatives and BLMB.

Next, examples of these compounds will be given: Crystal violet lactone, Malachite green lactone, Michler's hydrol, Crystal violet carbinol, Malachite green carbinol, N-(2,3-dichlorophenyl)-leucoauramine, N-benzoylauramine, N-acetylauramine, N-phenylauramine, Rhodamine B lactam, 2-(phenyliminoethanedilidene)-3,3-dimethylindoline, N-3,3-trimethylindolinobenzospiropyran, 8'-methoxy-N-3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-dimethoxyfluoran, 3-dimethylamino-6-methyl-7-benzoylaminofluoran, 1,3-dimethyl-6-diethylaminofluoran, 3-diethylamino-6-methyl-7-benzoylaminofluoran, 1,3-diethylamino-7-dibenzoylaminofluoran and 3-ethylamino-6-methyl-8-phenylaminofluoran and the like.

The phenolic hydroxyl group-containing compound includes monophenols to polyphenols, and their substituent includes an alkyl, aryl, acyl and alkoxycarbonyl groups and a halogen atom. Next, examples of these compounds will be given: Tert-butylphenol, nonylphenol, dodecylphenol, α-naphthol, β-naphthol, hydroquinone monomethyl ether, p-chlorophenol, p-bromophenol, o-chlorophenol, o-bromophenol, o-phenylphenol, p-phenylphenol, p-cumylphenol, methyl-p-benzoate, 3-isopropylcatechol, p-tert-butylcatechol, 4,4'-methylenediphenyl, bisphenol A, 1,1-dioxynaphthalene, 2,3-dioxynaphthalene, chlorocatechol, bromocatechol, 2,4-dihydroxybenzophenone, phenolphthalein, methyl gallate, ethyl gallate, propyl gallate, butyl gallate, hexyl gallate, octyl gallate, dodecyl gallate, cetyl gallate, stearyl gallate, tannic acid, phenol resins, phenylphenol resins and the like.

The inorganic solid acid includes for example silica/alumina, silica/magnesia, bentonite, kaolin, fuller's earth, terra abla, activated clay, montomorillonite, attapulgite, zinc oxide, titanium dioxide, calcium sulfate, barium sulfate, aluminum sulfate, aluminum chloride, lead chloride, tin chloride, arsenic dioxide and the like.

The organic acid includes for example acetic acid, propionic acid, butyric acid, caproic acid, benzoic acid, hydroxynaphthoic acid, salicylic acid, and the like, and their salts such as zinc salicylate, aluminum salicylate, t-butyl salicylic acid, zinc t-butyl salicylate, and the like.

The waxy substance (2) refers to a substance which will melt at temperature higher than a prescribed temperature, and in principle, substances which are inert to the foregoing color precursor (1) and color developing agent (3) are used. The prescribed temperature refers to the upper limit of a low temperature region at which the test sample (e.g. frozen foods, etc.) should be preserved. For example, with temperature-indicating sheets for test samples which should be preserved at a temperature below 20° C., the prescribed temperature is 20° C. This temperature is determined by the kind of test sample and desired preservation temperature, and it will suffice to select the waxy substance according to the preservation temperature. In many cases, the preservation is carried out at generally less than 20° C., particularly lower than about 10° C., and therefore, the waxy substance is selected from substances having a melting point in this range. Of course, this temperature is not limitative.

As the waxy substance used in the present invention, there are given for example aliphatic hydrocarbons (e.g. pentadecane, tetradecane, hexadecane, 1-heptadecane, 1-octadecane), aromatic hydrocarbons (e.g. p-xylene, dodecylbenzene), esters (e.g. tricaprin glyceride, 1-elaido-2,3-dicaprin glyceride, 1-linoleo-2,3-dilaurin glyceride, 2-oleo-1,3-dilaurin glyceride, 1-myristo-2,3-diolein glyceride, 1-palmito-2,3-diolein glyceride, ethyl myristate, methyl myristate, butyl myristate, methyl caproate, methyl caprate, methyl laurate, ethyl laurate, methyl palmitate, ethyl stearate, methyl stearate, pentadecyl acetate, ethylcaprinate, butyl caprinate, heptyl caprinate, decyl caprinate, methyl undecylate, butyl laurate, methyl dodecylate, ethyl tridecylate, propyl myristate, methyl pentadecylate, ethyl tridecylate, propyl myristate, methyl pentadecylate, ethyl pentadecylate, ethyl palmitate, propyl palmitate, butyl palmitate, ethyl stearate, propyl stearate, butyl stearate, methyl oleate, ethyl oleate), alcohols (e.g. 2-undecanol, benzyl alcohol, glycerol), ethers (e.g. benzyl ether, dioxane), ketones (e.g. diethylketone, ethyl butyl ketone, cyclohexanone, acetophenone), and the like.

These waxy substances should properly be selected according to the kinds and combinations of the color precursor and color developing agent, form of the temperature-indicating sheet and the like.

For example, when a leuco dye is used as the color precursor (1) and phenolic hydroxyl group containing as the color developing agent (3), the use of alcohols (e.g. 2-undecanol, glycerol) as the waxy substance inhibits color development, so that uses in the embodiments as shown in FIG. 1 and FIG. 2 and another third embodiment (color developing type) are not suitable. Contrary to this, these alcohols are useful in decoloring the colored substance produced from the leuco dye and organic carboxylic acid, so that uses in the embodiment as shown in FIG. 3 are useful. The reasons of selection of the waxy substance are (i) clear melting point, (ii) the possibility of broad selection, (iii) the combination of membrane/binder giving a practical diffusion rate (in the case of the compound alone and the combination of the compound with the color precursor or color developing agent), (iv) the possibility of microencapsulation, and (v) no problem in the discoloration (excepting the above case).

When, in the embodiment as shown in FIG. 3, a color precursor layer containing leuco dye and a phenolic hydroxyl group containing compound is mixed, the waxy substance may be ones having a decoloring action in themselves as described above, or may be blended with other compounds having a decoloring action. As the compounds having a decoloring action, there are given alcohols, esters, ketones, ethers and aromatic hydrocarbons as described below.

The alcohols include monohydric alcohols to polyhydric ones and their derivatives. Next, examples of the alcohols will be given: n-octyl alcohol, n-nonyl alcohol, n-decyl alcohol, n-lauryl alcohol, n-myristyl alcohol, n-cetyl alcohol, n-stearyl alcohol, oleyl alcohol, cyclohexanol, cyclopentanol, benzyl alcohol, cinnamyl alcohol, ethylene glycol, polyethylene glycol, propylene glycol, trimethylolpropane, pentaerythrite, sorbite and the like.

As the esters, the following compounds are given: Amyl acetate, octyl acetate, butyl propionate, ethyl caproate, amyl caprate, ethyl caprate, octyl caprate, lauryl caprate, methyl laurate, octyl laurate, lauryl laurate, methyl myristate, hexyl myristate, stearyl myristate, butyl palmitate, myristyl palmitate, methyl stearate, ethyl stearate, lauryl stearate, butyl benzoate, amyl benzoate, phenyl benzoate, ethyl acetoacetate, methyl oleate, butyl acrylate, dibutyl oxalate, diethyl malonate, dibutyl tartrate, dimethyl sebacate, dibutyl phthalate, dioctyl phthalate, dibutyl fumarate, diethyl maleate, triethyl citrate, 12-hydroxystearic acid triglyceride, castor oil, methyl dioxystearate, methyl 12-hydroxystearate and the like.

As the ketones, the following compounds are given: Diethyl ketone, ethyl butyl ketone, methyl hexyl ketone, mesityl oxide, cyclohexanone, methylcyclohaxanone, acetophenone, benzophenone, acetonylacetone, diacetone alcohol and the like.

As the ethers, the following compounds are given: Butyl ether, hexyl ether, diphenyl ether, dioxane, ethylene glycol dibutyl ether, diethylene glycol dibutyl ether, ethylene glycol diphenyl ether, ethylene glycol monophenyl ether and the like.

As the aromatic hydrocarbons, there are given for example p-xylene, isopropylbenzene, amylbenzene, mesitylene, cymene, 5-methyl-3-isobutyltoluene, dodecylbenzene, cyclohexylbenzene, biphenyl, methylbiphenyl, ethylbiphenyl, diethylbiphenyl, trimethylbiphenyl, benzylbenzene, phenyltolylmethane, xylylphenylmethane, ditolylmethane, trioctyldiphenylmethane, tribenzyldiphenylmethane, tolylxylylmethane, dixylylmethane, diphenylethane, triphenylethane, dixylylethane, phenylisopropylphenylethane, tolyldiisopropylphenylethane, trimethylisopropylphenylethane, diphenylpropane, ditolylpropane, phenyltolylpropane, phenylxylylpropane, tolylxylylpropane, dibenzylbenzene, dioctylbenzylethylbenzene, dibenzyltoluene, tetrahydronaphthylphenylmethane, tetrahydromethylnaphthylphenylethane, tetrahydronaphythylphenylethane, naphthylphenylmethane, methylnaphthylphenylethane, and the like.

The membrane (5) for diffusion and permeation is paper or non-woven fabrics. At that time, the pore size, density, thickness, etc. of the membrane may properly be changed in order to control a period of time required for the molten waxy substance to pass therethrough.

The weight ratio of microcapsule to emulsion, as converted to solid content, is preferably in the range of 30:1 to 1:2, and this range also applies to the case wherein regions different in solid content ratio are present in the same sheet.

The membrane used in this invention has a base weight of 20 to 200 g/m², preferably 30–100 g/m² and the ratio of the base weight of the membrane in grams per square meter to the thickness of the membrane in microns is not less than 0.3 and is preferably 0.5–5.

As a result of the membrane having the aforesaid characteristics and of the ratio of microcapsules to binder being 30:1 to 1:2, it is possible to make a very thin (generally about 0.05–0.3 mm, preferably about 0.1 mm) time/temperature-indicating sheet having excellent properties such as clear color changing, easy preservation, easy activation at use and easy production when used with the color precursor, waxy substances and color developing agent.

The reasons of selection of the above material for membrane and the ratio are (i) a not bulky sheet being obtained, (ii) the activation of the microcapsule being easy, and (iii) a practical diffusion rate (discoloring rate) being obtained.

If the ratio of microcapsule/binder is larger than 30/1, a discoloration rate becomes too large, whereas it is smaller than ½ the discoloration hardly occurs.

The other materials, for example, the color developing agent (3) in the case of the temperature indicating sheet as shown in FIG. 1, the color precursor (1) in the case of the sheet as shown in FIG. 2 and the colored mixture of color precursor (1) and color developing agent (3) in the case of the sheet as shown in FIG. 3 may be adhered to the membrane at the opposite side through a conventional binder including the aforementioned binder or others such as emulsion type binder, a solvent type binder (e.g. alkyd resin). For spot printing the solvent type binder is suitable.

Figure 4:
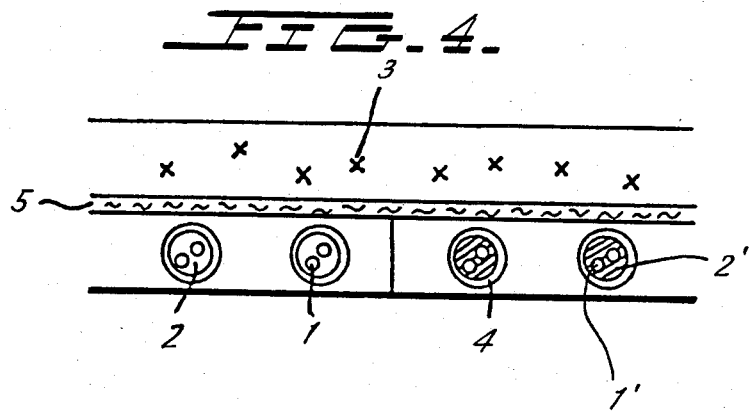
Figure 5:
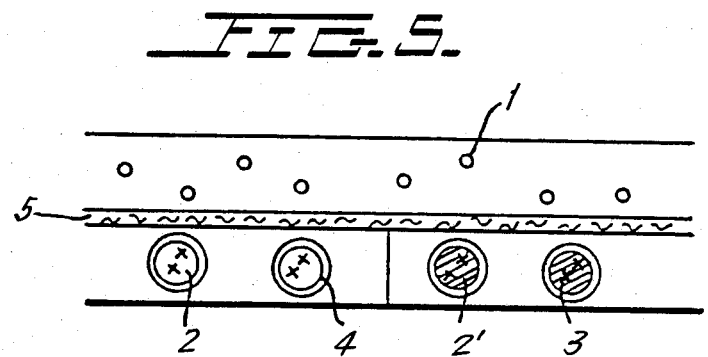
Figure 6:
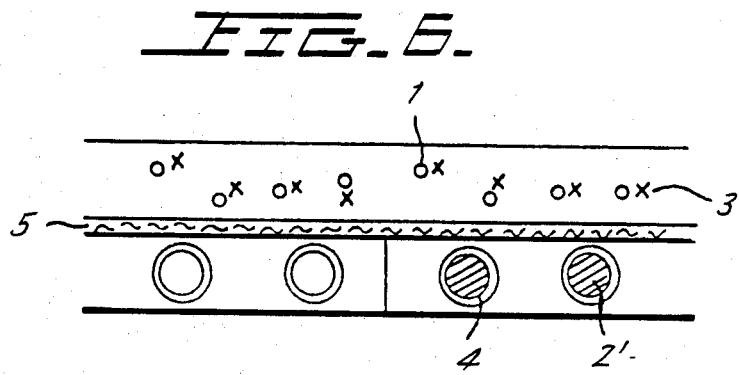

Also as shown by FIG. 4, when two or more microcapsules (4) including their respective waxy substances, for example (2) and (2'), which are different in melting point are arranged in the different regions of the temperature-indicating sheet, a rise in temperature can be known more accurately. At that time, a rise in temperature can be confirmed by color when two or more color precursors, for example (1) and (1'), are blended with their respective waxy substances which are different in melting point. Similarly, a method as described in FIG. 5 may be employed in which the waxy substances (2) and (2') are blended with the color developing agent (3), microencapsulated and coated onto different regions, and the color precursors (1) and (1') which develop different colors are arranged in the corresponding regions. Similarly, arrangement as shown in FIG. 6 will do.

Further, as shown in FIG. 7, two or more membranes different in thickness (or raw material), for example (5) and (5'), may be arranged in the same sheet to produce two regions in which the passage rates of the molten component are different from each other. By this means, the temperature hysteresis of frozen foods, etc. can be known more accurately. In this case, such means as to develop different colors at the regions may be employed.

Further, in order to regulate the permeability of the membrane, a membrane uniform in thickness such as paper may be coated with a proper resin component such as polyvinyl acetate, vinyl acetate copolymers, acrylic ester copolymers, etc. By this means, the thickness and material of the membrane can be changed to alter the discoloration rate partly.

As the microencapsulating technique used in the present invention, the conventionally well-known methods such as coacervation, in situ polymerization, interfacial polymerization, hardening and coating in water, phase separation from aqueous solution, phase separation from organic solution, etc. may be used optionally.

For coating component including microcapsules onto the membrane, various methods such as knife coating, blush coating, reverse roll coating, bar coating, air knife coating, etc. may be used. Of these methods, the air knife coating is desirable in order not to break the microcapsules on coating. A method to break the component including microcapsule upon use of said sheet is not particularly limited, but in order to grasp a change by both the temperature and time when the whole system has been exposed to temperatures higher than the prescribed one, it is desirable to break the microcapsule under a definite load with a hand roller, etc.

The size of the microcapsule shall be about 1 to about 300 micron in order to facilitate breaking by rollers, etc. upon use. Microcapsules of less than 1 micron in particle diameter are difficult to break, while those of larger than 300 micron cause problems on coating because of their too large particle diameter.

A film-forming component used in microencapsulation includes for example gelatin, alginic acid, acrylic polymers, methacrylic polymers, melamine and epoxy polymers which are easy to break by outer force at low temperatures.

The component which melts at the prescribed temperature and the substance which changes in color in contact with the component are generally coated onto the membrane by proper means. For this purpose, proper binders such as polyvinyl acetate, vinyl acetate copolymers (e.g. vinyl acetate/vinyl chloride copolymers, vinyl acetate/ethylene copolymers), acrylic ester copolymers are preferably used.

Another binder does not give a practicable diffusion rate. For example, the rate is too large or too small.

These binders are preferably used in the form of aqueous emulsion. With organic solvent type binders, there is a fear that the solvent itself sometimes acts as a color developing component to change the color of the finished temperature-indicating sheet, and besides that the solvent extracts the microencapsulated components. Also, with aqueous solution type binders, the viscosity of the binder is generally so high that the binder cannot be used in high solid concentrations, and therefore, the microcapsule/binder ratio on coating is limited. Blocking is also easy to appear. The aqueous emulsion type binder is suitable because it has no defects described above.

In the temperature-indicating sheet of the present invention, two or more binder layers which are different in component, for example (6) and (6'), as shown in FIG. 8, or two or more ones which are different in microcapsule/binder ratio (solid content ratio), for example (6) and (6''), as shown in FIG. 9, may be arranged in the same sheet. By employing this structure, regions are formed in the same sheet in which the passage rates of the molten component (A) through the binder layers are different from each other, as a result of which the discoloration rate changes partly. Consequently, it becomes possible to know a more detailed temperature hysteresis.

A binder which relatively delays the passage rate of the molten component containing waxy substance therethrough is acrylic ester copolymers, while a binder which relatively accelerates said passage rate is vinyl acetate copolymers.

The temperature-indicating sheet of the present invention may be packed with a plastic film, or covered with a plastic film at one side and/or the other side and inserted into the package of frozen foods, etc. If necessary, an adhesive layer (7) may be applied to the sheet as shown in FIG. 10 and attached to the package of frozen foods, etc. As such adhesive, any of the conventionally used ones which will not lose its effect if water is present, for example acrylic ester copolymers may be used.

When the adhesive layer (7) is applied, it may directly be applied to the binder layer containing the microcapsule, etc. In this case, however, the molten component containing waxy substance (2) also diffuses into the adhesive layer, so that it is desirable to apply a layer (8) impermeable to both the molten component and the color developing agent (3) between the binder and adhesive layers.

Additives for improving the necessary condition may be added so far as the irreversible discoloration intended by the present invention is not disturbed. Typical additives include for example antioxidants, ultraviolet absorbers, inorganic fillers, pigments, plasticizers, lubricants, antistatic agents and the like.

For sticking the temperature-indicating sheet of the present invention on low-temperature preserved goods, sticking with adhesives, hanging-down as label, direct adhesion to containers for said goods, and the like may be used.

Preferred application examples for the temperature-indicating sheet of the present invention include for example boiled fish pastes, raw noodles, yogurt, ichiyazuke (one kind of Japanese pickle), packed sushi and the like, but the example is not limited thereto.

The present invention will be illustrated specifically with reference to the following examples, which are not however to be interpreted as limiting the invention thereto.

EXAMPLE 1

PRODUCTION OF MICROCAPSULE

Twenty grams of dimethyl adipate containing dissolved CVL (crystal violet lactone) was mixed with 100 g of a 5% aqueous gelatin solution, and the mixture was heated to 50° C. and stirred so as to form fine oil droplets. Subsequently, 75 ml of a 5% aqueous CMC (carboxymethyl cellulose) solution was added. After reducing the pH to 4.8, the whole system was cooled to 4° to 5° C., and 37% formalin was added to harden the droplets. After raising the pH to 10.0, the temperature of the system was gradually raised to 50° C. over 2 hours to obtain the desired microcapsule. This microcapsule may be filtered off, centrifungally concentrated and dried, but may also be used in the concentrated state (i.e. wet cake). In this example and the subsequent ones, the microcapsule was used in the form of wet cake after filtration.

PRODUCTION OF TEMPERATURE-INDICATING SHEET

Activated clay was dispersed in an aqueous polyvinyl alcohol solution and uniformly coated onto the surface of wood free paper 55 g/m$^2$/60$\mu$. The microcapsule wet cake prepared above was dispersed in polysol MC5 (styrene-acryl emulsion, produced by SHOWA HIGH-POLYMER CO., LTD.) at a solid ratio of 3/1 solution and coated onto the back surface of the paper in a thickness of 60 micrometer by means of a bar coater. After sufficient drying, the test paper was divided into two equal parts, and the microcapsule in the both parts was broken by applying a load of about [1 kg/(0.05 cm$^2$)–20 kg/cm$^2$]. One part (a) was allowed to stand at room temperature (up to 25° C.), the other part (b) was preserved at a low temperature (up to 5° C.), and a change in color was examined. With (a), color development began at once, reaching the saturated color in about 30 minutes, but (b) showed no discoloration. After passage of one week, on allowing (b) to stand again at room temperature, discoloration was found to begin at once.

Microcapsules were produced according to the methods described below, and temperature-indicating sheets were produced according to Example 1. The materials used and the results obtained are shown in Table 1. In the table, (A) is a microcapsule including the dissolved waxy substance, (B) is a substance changing in color in contact with (A), (C) is the kind and thickness of a membrane, and (D) is a change in color and a discoloration-beginning temperature and time.

dropwise a hardening agent, the system was reacted at 80° C. for 5 hours to obtain the desired microcapsule.

TABLE 1

| Example No. | (A) | binder | solid ratio (MC/B) | (B) | (C) Thickness ($\mu$m) ($g/m^2$) | (D) Temp. × time |
|---|---|---|---|---|---|---|
| 2 | Microcapsule prepared for Example 2 | SUMIKAFLEX #830 | 5/1 | CVL | Paper (70) (65 $g/m^2$) | Colorless → blue 10° C. × 1 hr |
| 3 | Microcapsule prepared for Example 3 | POLYSOL MC-5 | 9/1 | CVL/nonyl phenol | Paper (70) (65 $g/m^2$) | Blue → colorless 11° C. × 1 hr |
| 4 | Microcapsule prepared for Example 4 | SUMIKAFLEX #830 | 3/1 | CVL/nonyl phenol | Paper (70) (65 $g/m^2$) | Blue → colorless 19.5° C. × 3 hr |
| 5 | Microcapsule prepared for Example 5 | POLYSOL P-300 | 3/1 | CVL/nonyl phenol | Paper (70) + polyvinyl chloride (15) (65 $g/m^2$) | Blue → colorless 9.5° C. × 3 hr |
| 6 | Microcapsule prepared for Example 6 | SUMIKAFLEX #400 | 5/1 | CVL/nonyl phenol | Paper (70) (65 $g/m^2$) | Blue → colorless 13° C. × 1 hr |

PRODUCTION OF MICROCAPSULE USED FOR EXAMPLE 2

Twenty grams of a nonyl phenol/pentadecane mixture, 10 g of methyl methacrylate and 50 mg of azobisisobutyronitrile were mixed to make a uniform solution. This solution was dispersed in 100 g of a 0.5% methyl cellulose solution to form fine oil droplets. Thereafter, this system was reacted at 75° C. for 5 hours to obtain the desired microcapsule.

PRODUCTION OF MICROCAPSULE USED FOR EXAMPLE 3

Fifty grams of ethyl myristate was added dropwise to an aqueous solution of 2 g of sodium alginate and 1 g of gelatin in 150 ml of water, and the system was stirred until formation of fine oil droplets was completed. On adding dropwise this dispersion liquid to 500 g of a 10% aqueous calcium chloride solution separately prepared, sodium alginate was hardened to obtain the desired microcapsule.

PRODUCTION OF MICROCAPSULE USED FOR EXAMPLE 4

A mixture of 4 g of terephthalic acid dichloride and 50 g of acetophenone was added to a 1% aqueous sodium hydroxide solution containing 5 g of dissolved bisphenol A, and the system was stirred until formation of fine oil droplets was completed. The system was reacted at 50° C. for 2 hours to obtain the desired microcapsule.

PRODUCTION OF MICROCAPSULE USED FOR EXAMPLE 5

To a solution of 1.5 g of U-ramin P-6300 (methoxymethylolmelamine, produced by MITSUITOATSU CHEMICALS, INC.) in 150 g of water was added 50 g of a mixture of lauryl alcohol and n-pentadecane, and the system was stirred until formation of fine oil droplets was completed. Thereafter, the pH was adjusted to 4 to 5, and the system was reacted at 50° C. for 5 hours to obtain the desired microcapsule covered with the melamine resin.

PRODUCTION OF MICROCAPSULE USED FOR EXAMPLE 6

A mixture of 5 g of Epikote 828 (epoxy resin, produced by YUKA SHELL EPOXY KABUSHIKIKAISHA) and p-xylene was dispersed in 200 g of a 0.5% aqueous CMC solution, and after gradually adding

EXAMPLE 8

Twenty grams of methyl myristate was mixed with 100 g of a 5% aqueous gelatin solution and stirred at 50° C. to form fine oil droplets.

Thereafter, 75 ml of a 5% aqueous carboxymethyl cellulose solution was added thereto, and the pH was adjusted to 4.8, and the system was cooled to 5° C.

After adding 37% formalin, the pH was adjusted to 10 and the temperature was gradually raised to 50° C. to obtain microcapsules of 1 to 100 micrometer in particle diameter. The system was concentrated to obtain a microcapsule wet cake having a water content of 40%.

The wet cake and Polysol P-300 (ethylene/vinyl acetate emulsion, produced by SHOWA HIGH-POLYMER CO., LTD.) were mixed at a rate of 3:1 to prepare an ink.

On the surface of a fine quality paper (55 $g/m^2$; 60 $\mu$m), the dispersion of CVL and bisphenol A in polyvinyl alcohol solution (said ratio 1/3/5) was coated at a rate of 2 $g/m^2$. The surface coated paper was heated in 150° C. oven for 5 minutes to change the color blue. Sumika Flex 830 (vinyl acetate/ethylene/vinyl chloride copolymer, produced by SUMITOMO CHEMICAL CO., LTD.) was coated as a membrane onto the surface opposite to the developed surface so that the amounts coated were 5 $g/m^2$ and 10 $g/m^2$ at one half and the other half, respectively, of the surface. After drying, the ink prepared above was coated onto the dried membrane at a rate of 40 $g/m^2$ and dried.

Thereafter, Polysol EVA-AD5 (ethylene/vinyl acetate emulsion, produced by SHOWA HIGH-POLYMER CO., LTD.) was coated as a permeation inhibitor onto the ink-coated surface at a rate of 10 $g/m^2$ and dried.

Separately, Nikasol TS-444 (emulsion type adhesive, produced by NIPPON CARBIDE INDUSTRIES CO., LTD.) was coated onto a release paper at a rate of 40 $g/m^2$, dried and stuck on the above laminated thermal recording paper to prepare a test label. The thickness of this label was 0.15 mm.

A load of about 20–100 $kg/cm^2$ was applied to the label to break the microcapsule, and the label was placed in a constant-temperature apparatus kept at 10° C. The label was observed after one week, but there was no change. Thereafter, on raising the temperature to 13° C., discoloration began at the 5 $g/m^2$ membrane-coated part after 3 hours and completed after 8 hours.

While, at the 10 g/m² membrane-coated part, discoloration began after 10 hours and completed after 20 hours.

EXAMPLE 9

Twenty grams of methyl myristate, 10 g of methyl methacrylate and 50 mg of AIBN were mixed to make a solution.

The solution was dispersed in 100 g of a 5% aqueous methyl cellulose solution to form fine oil droplets. The system was then reacted at 75° C. for 5 hours to obtain microcapsules of 10 to 50 micrometer in particle diameter.

The system was concentrated to obtain a microcapsule wet cake having a water content of 30%. The wet cake was mixed with Polysol MC-5 (styrene/acrylate copolymer, produced by SHOWA HIGHPOLYMER CO., LTD.) at a rate of 3:1 to prepare an ink.

The dispersion obtained by dispersing bisphenol A and CVL in an aqueous solution of polyvinyl alcohol (2-1/5) was coated on the surface of a fine quality paper (55 g/m²; 60 μm) at a rate of 5 g/m². The surface coated paper was heated in 150° C. oven for 15 minutes to change the color to blue. Sumika Flex 830 and Polysol P-25 (vinyl acetate-acryl copolymer emulsion produced by SHOWA HIGHPOLYMER CO., LTD.) were coated as a membrane at a rate of 5 g/m² onto one half and the other half, respectively, of the surface opposite to the developed surface. After drying, the ink prepared above was coated onto the dried membrane at a rate of 50 g/m² and dried. Thereafter, Mowinyl 184E (ethyl/vinyl acetate copolymer, produced by HOECHST JAPAN, LTD.) was coated as a permeation inhibitor onto the ink-coated surface at a rate of 5 g/m², and dried.

Separately, Nikasol TS-444 was coated onto a release paper at a rate of 40 g/m², dried and stuck on the above laminated thermal recording paper to prepare a test label. The thickness of the label was 0.12 mm.

A load of about 20-100 kg/cm² was applied to the label to break the microcapsule, and the label was placed in a constant-temperature apparatus kept at 10° C. The label was observed after one week, but there was no change. Thereafter, on raising the temperature to 13° C., discoloration began at the Sumika Flex 830-coated part after 2 hours and completed in 5 hours. While, at the Polysol P-25-coated part, discoloration began after 10 hours and completed after 24 hours.

EXAMPLE 10

A mixture of 20 g of methyl oleate and 100 g of a 5% aqueous gelatin solution was stirred at 50° C. so as to form fine oil droplets. Thereafter, 75 ml of a 5% aqueous carboxymethyl cellulose solution was added thereto, and after reducing the pH to 4.8, the system was cooled to 4° to 5° C. After adding 37% formalin to harden the oil droplets, the pH of the system was raised to 10, and the system was heated to 50° C. over 2 hours to obtain the desired microcapsule of 1 to 100 micrometer in particle diameter. The microcapsule may be filtered off and centrifugally concentrated, and dried, but may also be used in the concentrated state (i.e. wet cake). In this example, the microcapsule was used in the form of wet cake.

The microcapsule prepared above was uniformly mixed with Polysol P 300 (ethylene/vinyl acetate emulsion, produced by SHOWA HIGHPOLYMER CO., LTD.) at a rate of 3:1. The dispersion obtained by dispersing bisphenol A and CVL in an aqueous solution of polyvinyl alcohol (2-1/5) was coated on the surface of a fine quality paper (55 g/m²; 60 μm) at a rate of 5 g/m². The surface coated paper was heated in 150° C. oven for 15 minutes to change the color to blue. The above mixed solution was coated in a thickness of 60 micrometer onto the surface opposite to the developed surface. After sufficient drying, Polysol EVA-AD5 (ethylene/vinyl acetate emulsion, produced by SHOWA HIGHPOLYMER CO., LTD.) was coated as a permeation inhibitor onto the microcapsule-coated surface in a thickness of 15 micrometer, and dried. Separately, Nikasol TS-444 (emulsion adhesive, produced by NIPPON CARBIDE INDUSTRIES CO., LTD.) was coated onto a release paper in a thickness of 90 micrometer and dried to prepare a film. This film was stuck on the previously obtained coated developed paper to prepare a test label. The thickness of the label was 0.1 mm. A load of about 20-100 kg/cm² was applied to the label to break the microcapsule, and the label was stuck on test paper and placed in a constant-temperature apparatus kept at 5° C. The label was observed after one week, but there was no change. Thereafter, on raising the temperature to 7° C., discoloration began at once and completed in about 5 hours. At that time, the thickness of the microcapsule layer was 50 micrometer, that of the permeation inhibiting film was 5 micrometer and that of the adhesive layer was 30 micrometer.

EXAMPLE 11

Twenty grams of ethyl myristate, 10 g of methyl methacrylate and 50 mg of AIBN were uniformly mixed to make a solution. This solution was dispersed in 100 g of a 0.5% methyl cellulose solution to form fine oil droplets. Thereafter, the system was reacted at 75° C. for 5 hours to obtain the desired microcapsule.

The ethyl myristate-including microcapsule thus obtained was mixed with Sumika Flex #400 (ethylene/vinyl acetate emulsion, produced by SUMITOMO CHEMICAL CO., LTD.) at a rate of 3:1 and coated onto a developed thermal paper made by the same manner in Example 10 by means of a bar coater (dry thickness, 55 micrometer). Thereafter, a 10% aqueous polyvinyl alcohol solution of Gosenol GM-14L (produced by NIPPON SYNTHETIC CHEMICAL INDUSTRIES CO., LTD.) was coated onto the microcapsule-coated surface of the paper in a thickness of 15 micrometer. In the same manner as in Example 7, an adhesive was transferred to the paper to prepare a test label. The thickness of the label was 0.12 mm.

A load of 20-100 kg/cm² was applied to the test label to break the microcapsule, and the label was stuck on test paper and placed in a constant-temperature apparatus kept at 5° C. The label was observed after one week, but there was no change. On allowing the label to stand at 7° C., discoloration began in about 1 hour and completed in about 6 hours.

EXAMPLE 12

Sixty grams of methyl myristate, methyl methacrylate and AIBN were mixed to make a uniform solution which was then dispersed in a 0.5% aqueous methyl cellulose solution on a homogenizer and reacted at 75° C. for 5 hours. After cooling, the reaction mixture was filtered to obtain a wet cake having a solid content of 65%. The particle diameter of the microcapsule obtained was 5 to 30 micrometer. In the same manner as above, microcapsules including ethyl stearate were prepared.

Each wet cake was mixed with Polysol MC-5, a binder (Styrene-acryl copolymer emulsion produced by SHOWA HIGHPOLYMER CO., LTD.), at a rate of 9:1 to prepare an ink. Separately, the dispersion obtained by dispersing bisphenol A and CVL in aqueous solution of polyvinyl alcohol (2:1:5) was coated on the surface of a fine quality paper (55g/m$^2$, 60 μm) obtained paper was heated to develop a color over the whole surface, and the above inks were coated as follows onto the surface opposite to the developed surface: Microcapsules including methyl myristate was coated on the right half of the surface, those including ethyl stearate on the left half of the surface, and the coating thickness was regulated so that the amount coated was 40 g/m$^2$ in each case. Both the microcapsules were broken by applying a load of 30–100 kg/cm$^2$, and a color development test was carried out at 13° C. As a result, color development began at the right half in about 1 hour and completed in 6 hours, but the left half showed no change even after one day. On raising the temperature to 20° C., discoloration began also at the left half and completed in 6 hours.

EXAMPLE 13

According to the method of Example 12, ethyl laurate-including microcapsules and methyl laurate-including ones were prepared. The wet cake of each microcapsule was mixed with Polysol MC-5 (produced by SHOWA HIGHPOLYMER CO., LTD.) at a rate of 9:1 to prepare an ink. The dispersion obtained by dispersing bisphenol A and CVL in an aqueous solution of polyvinyl alcohol (2-1/5) was coated on the surface of a fine quality paper (55 g/m$^2$; 60 μm) at a rate of 5 g/m$^2$. The surface coated paper was heated in 150° C. oven for 15 minutes to change the color to blue. And both the inks were coated as follows onto the surface opposite to the developed surface: Microcapsules including ethyl laurate was coated onto the right half of the surface and those including methyl laurate onto the left half of the surface at a rate of 40 g/m$^2$ in each case. The thickness of this label was 0.15 mm. Both the microcapsules were broken by applying a load of 30–100 kg/cm$^2$, and the test paper was placed in a constant-temperature apparatus kept at −15° C., but there was no change after one week. On keeping the test paper at −10° C., discoloration began at the right half after about 1 hour and completed in 6 hours. The left half showed no change even after allowed to stand for one day after that.

On keeping the test paper at 5° C., discoloration began at the left half after about 2 hours and completed in about 6 hours.

EXAMPLE 14

Twenty grams of methyl myristate was mixed with 100 g of a 5% aqueous gelatin solution and stirred at 50° C. to form fine oil droplets.

Thereafter, 75 ml of a 5% aqueous carboxymethyl cellulose solution was added thereto to adjust the pH to 4.8, and the system was cooled to 5° C.

After adding 37% formalin, the pH was adjusted to 10 and the temperature was gradually raised to 50° C. to obtain microcapsules of 1 to 100 micrometer in particle diameter. The system was concentrated to obtain a microcapsule wet cake having a water content of 40%.

The wet cake was mixed with Polysol MC-5 at varying rates of 5:1 and 9:1 to prepare two kinds of ink. The thermal paper made by the same matter in Example 13 was developed over the whole surface, and the above inks were coated onto the right and left parts, respectively, of the surface opposite to the developed surface at a rate to 30 g/m$^2$ in each case, and dried.

Thereafter, Polysol EVA.AD-5, a permeation inhibitor, was coated onto the above ink-coated surface at a rate of 5 g/m$^2$ and dried.

Separately, Nikasol TS-444 was coated onto a release paper at a rate of 40 g/m$^2$ and dried, and the paper was stuck on the foregoing laminated thermal recording paper to prepare a test label. The thickness of the label was 0.1 mm.

A load of about 20–100 kg/cm$^2$ was applied to the label to break the microcapsule, and the label was placed in constant-temperature apparatus kept at 10° C. The label was observed after one week, but there was no change. Thereafter, on raising the temperature to 15° C., discoloration began at the 9:1 ink-coated part after 1 hour and completed after 2 hours. At the 5:1 ink-coated part, discoloration began after 3 hours and completed after 4 hours.

EXAMPLE 15

Twenty grams of methyl myristate, 10 g of methyl methacrylate and 50 mg of AIBN were mixed to make a solution.

The solution was dispersed in 100 g of a 5% aqueous methyl cellulose solution to form fine oil droplets. The system was then reacted at 75° C. for 5 hours to obtain microcapsules of 10 to 50 micrometer in particle diameter. The system was concentrated to obtain a microcapsule wet cake having a water content of 30%.

The wet cake was mixed with each of Polysol MC-5 and Voncoat EC-821 (DAINIPPON INK AND CHEMICALS, INC.) at a rate of 9:1 to prepare two kinds of ink.

The thermal paper made by the same manner in Example 13 was developed over the whole surface, and the above inks were coated onto the right and left parts, respectively, of the surface opposite to the developed surface at a rate of 40 g/m$^2$ in each case, and dried.

Mowinyl 184E, a permeation inhibitor, was coated onto the above ink-coated surface at a rate of 10 g/m$^2$ and dried.

Separately, Nikasol TS-444 was coated onto a release paper at a rate of 40 g/m$^2$ and dried, and the paper was stuck on the foregoing laminated thermal recording paper to prepare a test label. The thickness of the label was 0.15 mm.

A load of about 20–100 kg/cm$^2$ was applied to the label to break the microcapsule, and the label was placed in a constant-temperature apparatus kept at 10° C. The label was observed after one week, but there was no change. Thereafter, on raising the temperature to 15° C., discoloration began at the Polysol MC-5 ink-coated part after 2 hours and completed after 3 hours.

At the Voncoat EC-821 ink-coated part, discoloration began after 3 hours and completed after 5 hours.

EXAMPLE 16

PRODUCTION OF MICROCAPSULE

CVL (1 g), methyl myristate (20 g), methyl methacrylate (10 g) and AIBN (50 mg) were mixed to give a homogenous solution, which was dispersed in 100 g of aqueous solution of methyl cellulose (0.5 wt. %) to form fine oil droplets. The dispersion was treated at 75° C. for 5 hours to obtain a microcapsule having a particle size of 10–50 micrometer.

PRODUCTION OF A TEMERATURE-INDICATING SHEET

Activated clay was dispersed in an aqueous polyvinyl alcohol solution and uniformly coated onto the surface of fine quality paper (55 g/60 micron) at a rate of 10 g/m². On the surface of the paper the ink which was prepared by mixing the above microcapsule cake with Sumika Flex 830 at a solid ratio of 5/1 was coated at a rate of 60 g/m² by bar-coater, on which an adhesive agent was coated at a rate of 30 g/m² to make label. The thickness of the label was 0.1 mm.

To the above label a load of 20–100 kg/cm² was applied to break the microcapsule, and then the label was kept at 10° C., but no change was observed after one week. Raising the temperature to 13° C., the color of the label began to change to blue in one hour and completely discolored in about 8 hours.

EXAMPLE 17

The solution of 1% by weight of CVL (20 g)in lauryl alcohol, methyl methacrylate (10 g) and AIBN (50 mg) were mixed to give a homogenous solution, which was dispersed into 100 g of aqueous solution of methyl cellulose (0.5 wt %) to form fine oil droplets. The dispersion was treated at 75° C. for 5 hours to give a desired microcapsule.

The microcapsule was mixed with Sumika Flex 830 at a solid ratio of 2/1, and the mixture was applied to the back surface of fine quality paper (65 g/70 micrometer) at a rate of 60 g/m². The front surface of the paper was coated with a dispersion of active clay in polyvinyl alcohol solution (solid ratio: 1/1), and on the microcapsule layer adhesivs were coated at a rate of 30 g/m² to make a label.

A load of 20–100 kg/m² was applied to the label to break the microcapsule, which was kept at 5° C. for one week so as not to show any change in color, but raising temperature to 8° C., discoloration began immediately and completely discolored in 3 hours.

EXAMPLE 18

According to the same manner as Example 16, excepting using CVL (1 g), pentadecane (20 g), methyl myristate (10 g) and AIBN (50 mg) a desired microcapsule was obtained.

The dispersion of active clay of polyvinyl alcohol solution (solid ratio: 1/1) was coated on the surface of fine quality paper (55 g) at a rate of 5 g/m², and on the back surface of the paper the ink which was prepared by mixing of the above microcapsule (wet cake) and Polysol MC-5 (solid ratio: 9/1) was coated at a rate of 60 g/m², and 30 g/m² of adhesives (Nikasol TS 444) was additionally coated to give a label. The thickness of the label was 0.15 mm. A load of 20–100 Kg/cm² was applied to the label to break the microcapsule, and the resultant label was kept at 0° C. for one week without any change in color, but kept at 3° C., the change to blue began in 3 hours and completely discolored in 8 hours.

EXAMPLE 19

According to the same manner as Example 16, excepting using CVL (1 g), resorcin methyl ether (20 g), methyl methacrylate (10 g) and AIBN (50 mg), wet cake of microcapsule was prepared.

The above microcapsule and Sumika Flex 830 were mixed at a solid rate of 2:1 to prepare an ink. The dispersion of active clay in polyvinyl alcohol solution (solid rate: 1/1) was coated on the surface of a fine quality paper (55 g/60 micron) at a rate of 5 g/m², and on the back surface the above ink was coated at a rate of 60 g/m², on which adhesives (Nikasol TS444) were coated at a rate of 30 g/m² to make a label. The label has a thickness of 0.12 mm. On the label a load of 20–100 kg/cm² was applied and soon kept at −20° C. in freezer for one week, but it showed no change. Raised to −15° C., the color of the label began to change to blue in 3 hours, and complete it in about 8 hours.

EXAMPLE 20

NCO (red/non-color dye, available from HODO-GAYA KAGAKU KOGYO K.K.) (1 g), methyl myristate (20 g), methyl methacrylate (10 g) and AIBN (50 mg) were mixed to give a solution, which was dispersed in 100 g of aqueous solution of methyl cellulose (0.5 wt. %) to make fine droplets. The mixture was treated at 75° C. for 5 hours to give a microcapsule having a particle size of 10–50 micron. The resultant was concentrated to the wet cake of microcapsule containing a 30% of residual water, which was mixed with Polysol MC-5 at a rate of 3:1 to make an ink.

The dispersion of Bisphenol A (2,2-bis(4'-oxyphenyl)-propane) in polyvinyl alcohol (solid ratio: 1/2) was applied to the surface of a fine quality paper (55 g/60 micron) at a rate of 5 g/m². On the back surface the above ink was coated at a rate of 55 g/m², on which adhesives (Nikasol TS444) were coated at a rate of 30 g/m² to make a label. The thickness of the label is 0.12 mm without a release paper. A load of 20–100 g/cm² was applied on the label to break the microcapsule. When the label was kept at 10° C. for one week, any change in color was not observed, but raised to 13° C., it began to red in 5 hours and completely discolored in 15 hours.

EXAMPLE 21

According to the manner as described in Example 20 a mixture of NC-G (green/non-color dye, available from HODOGAYA KAGAKU KOGYO K.K.) (1 g), methyl myristate (20 g), methyl methacrylate (10 g) and AIBN (50 mg) was prepared.

The dispersion of Bisphenol A in polyvinyl alcohol solution (solid ratio: 1/2) was coated on a non-woven fabric (50 g/100 micron), and on the back surface the mixture of the above microcapsule wet cake and Mowinyl 770 (polyvinyl acetate resin, available from HO-ECHST JAPAN, LTD.) (solid ratio: 3/1) was coated at a rate of 60 g/m², on which adhesives (Nikasol TS444) were coated at a rate of 30 g/m² to give a label. The label has a thickness of 0.18 mm.

A load of 20–100 kg/m² was applied to the label as prepared according to the above to break the microcapsule. When the label in which microcapsule was broken was kept at 10° C., the change in color was not observed in one week, but raising the temperature to 13° C., the discoloration to green began in 30 minutes and completely discolored in 2 hours.

EXAMPLE 22

Twenty gram of CVL of solution in methyl myristate (1 wt %) was mixed with 100 g of aqueous solution of gelatin (5 wt %) and heated to 50° C. to form a fine droplet, into which 75 ml of aqueous solution of carboxy methyl cellulose was added. After pH was adjusted to 4.8, the whole of the mixture was cooled to 4°-5° C., and then formalin (37%) was added to cure it, followed by raising the pH value to 10.0 and then temperature to 50° C. gradually over two hours. A desired fine microcapsule having a diameter of 1-50 micrometer, which was filtered to give a wet cake.

The mixture of active clay and polyvinyl alcohol (solid ratio: 1/1) was coated on the surface of a fine quality paper (55 g/m$^2$) was coated at a rate of 5 g/m$^2$, and the back surface of the paper, the ink which was prepared from the above wet cake and Sumika Flex 830 (solid ratio: of 5/1) was coated at a thickness of 60 g/m$^2$, on which adhesives (Nikasol TS444) were coated at a rate of 30 g/m$^2$ to form a label. A load of 20-100 g/m$^2$ was applied to break the microcapsule, and then the label was kept at 10° C. for one week, but discoloration did not occur. Raising the temperature to 13° C., the discoloration to blue became to occur in one hour and completely discolored in 8 hours.

COMPARATIVE EXAMPLE 1

According to Example 16 excepting the solid ratio of the microcapsule and Sumika Flex being 40/1, an ink was prepared. The ink was coated on the back surface of the fine quality paper at a rate of 60 g/m$^2$, on which the adhesives were coated at 30 g/m$^2$ to give a label. A load of 20-100 kg/m$^2$ was applied to the label to break the microcapsule, which began to discolor soon. On keeping the it at 10° C., the discoloration did not progress, but on raising the temperature to 13° C., it began immediately and completely discolored in 30 minutes.

COMPARATIVE EXAMPLE 2

According to Example 16 excepting the solid ratio of the microcapsule and Sumika Flex being 1 to 3 an ink was prepared. The ink was coated on the back surface of a fine quality paper at a rate of 60 g/m$^2$, on which adhesives (Nikasol TS444) were coated at a rate of 30 g/m$^2$ to make a label. A load of 20-100 kg/m$^2$ was applied to the label, and kept at 13° C. but did not discolor after one day.

COMPARATIVE EXAMPLE 3

A label was prepared according to Example 16 excepting using a fine quality paper (15 g/m$^2$, thickness: 20 micron), coating the dispersion of active clay in polyvinyl alcohol solution (solid ratio: 1/1) on the surface at a rate of 10 g/m$^2$, coating the ink of the microcapsule/Sumika Flex 830 (solid ratio: 1/1) at a rate of 60 g/m$^2$ and then coating an adhesive Nikasol TS444 at a rate of 30 g/m$^2$.

A load of 20-100 kg/m$^2$ was applied on the label and kept at 10° C., but any discoloration was not observed after one week. Raising the temperature to 13° C., the discoloration immediately occurred and completely discolored in 0.5 to one hour.

COMPARATIVE EXAMPLE 4

According to Example 16 excepting using a fine quality paper (230 g/m$^2$), and coating an obtained ink by the same manner as in Comparative Example 5, a label was prepared. A load of 20-100 kg/cm$^2$ was applied to the label, followed by keeping it at 10° C. for one week, but any change in color was not observed. Raising the temperature to 13° C., it did not show any discoloration.

COMPARATIVE EXAMPLE 5

According to Example 16 excepting using Impranil DLH (urethan emulsion, available from SASAKI KASEI & CO., LTD.) as a binder with microcapsule of Example 16 and at a solid ratio of 3/1, an ink was prepared, and a label was prepared according to Comparative Example 5, excepting using a fine quality paper (55 g/m$^2$, thickness: 60 micron). A loading of 20-100 kg/cm$^2$ was applied, and the label was kept at 13° C. for 24 hours, but no discoloration occurred.

COMPARATIVE EXAMPLE 6

Using the microcapsule of Example 16 and Luxter DS-604 (SBR, available from Dainippon Ink K.K.) as a binder at a solid ratio of 5/1, an ink was prepared. A label was prepared according to Comparative Example 5 using a fine quality paper (55 g/m$^2$, thickness: 60 micron). A load of 20-100 kg/cm$^2$ was applied and the label was kept at room temperature (25° C.) for 24 hours, but no discoloration occurred.

COMPARATIVE EXAMPLE 7

An ink was prepared using the microcapsule of Example 16 and Sumika Flex 830 (solid ratio: 5/1). As a supporter a non-woven fabric (50 g/m$^2$, thickness: 0.5 mm) was used, on the surface of which the dispersion of active clay in polyvinyl alcohol solution (solid ratio: 1/1) was coated at a rate of 10 g/m$^2$. Three percent aqueous solution of gelatin was adsorbed into the non-woven fabric. After the dry of the surface the microcapsule ink was coated, dried and adhesives (Nikasol TS444) were coated to make a label.

A load of 20-100 kg/cm$^2$ was applied to the label, and the label was kept at 10° C. for one week, but any discoloration did not occurred, and then kept at a room temperature (25° C.), but any change in color did not occurred, either. The thickness of the label is 0.6 mm.

COMPARATIVE EXAMPLE 8

A label was prepared according to Comparative Example 7, using gelatin barrier as a permeability controlling membrane but the thickness of the supporter (non-woven fabric) being 0.25 mm. An obtained label thickness is 0.35 mm. A load of 20-100 kg/cm$^2$ was applied to the label, which was kept at a room temperature (25° C.), but any discoloration did not occurred.

COMPARATIVE EXAMPLE 9

An ink was prepared using the microcapsule of Example 16 and Sumika Flex 830 as a binder at a solid ratio of 5/1. The dispersion of active clay in polyvinyl alcohol solution (solid ratio: 1/1) was coated on the surface of a non-woven fabric (50 g/m$^2$, thickness: 0.25 mm) at a rate of 10 g/m$^2$, and on the back surface the above ink was coated at a rate of 60 g/m$^2$, on which adhesives Nikasol TS444 was coated at a rate of 30 g/m$^2$ to give a label. To the label a load 20-100 kg/cm$^2$ was applied, and then it was kept at room temperature. Any discoloration was not observed.

EXAMPLE 23

Ethyl myristate (20 g), zinc p-tert-butylsalicylate (1 g), methyl methacrylate (10 g) and AIBN (50 mg) were mixed to make a solution. The resultant mixture was dispersed in aqueous solution of methyl cellulose (0.5 wt. %) to form fine droplets, which was treated at 75° C. for 5 hours to give a desired microcapsule.

On the surface of a fine quality paper (55 g/m², thickness: 60 micron) the dispersion of CVL in polyvinyl alcohol solution (a solid ratio of 1:5) was coated at a rate of 1 g/m². On the back surface of the paper the mixture of the above microcapsule and Polysol MC-5 (a solid ratio of 9:1) was coated at a rate of 60 g/m², on which an adhesive Nikasol TS444 was coated at a rate of 30 g/m² to make a label.

On this label a load of 20–100 kg/cm² was applied, and then it was kept at 5° C. for one week, but any change in color was not observed. After that raising the temperature to 8° C., coloration to blue began and completely discolored in 3 hours.

EXAMPLE 24

Lauryl alcohol (20 g), zinc tert-butylsalicylate (1 g), methyl methacrylate (10 g) and AIBN (50 mg) were mixed to make a solution, from which an ink was produced by a similar manner as described in Example 23. A label was prepared by coating the ink on a fine quality paper (55 g/m², thickness: 60 micron) according to Example 23. To the label a load of 20–100 kg/cm² was applied, and it was kept at 0° C. for one week, but any change in color did not observed. Raising the temperature to 3° C., the discoloration began in 3 hours and completely discolored in 9 hours.

EXAMPLE 25

Pentadecane (20 g), zinc tert-butylsalicylate (1 g), methyl methacrylate (10 g) and AIBN (50 mg) were mixed and then a microcapsule was prepared according to Example 23. Polyvinyl alcohol solution of NC-O[#1] (solid ratio: 5/1[#2]) was coated on a fine quality paper (55 g/m²) at a rate of 1 g/m², on which further the mixture of the above microcapsule and Sumika Flex 830 (solid ratio: 5/1) was coated at a rate of 60 g/m². Further, adhesives (Nikasol TS444) were coated on the surface at a rate of 30 g/m² to make a label. To the label a load of 20–100 kg/cm² was applied and it was kept at 0° C. for one week, but any change in color was not observed, whereas at 3° C. the change was observed in one hour and completely discolored in 6 hours.

EXAMPLE 26

Resorcin momomethyl ether (20 g), zinc tert-butylsalicylate (1 g), methyl methacrylate (10 g) and AIBN (50 mg) were mixed to prepare a microcapsule according to Example 23. On a fine quality paper (55 g/m², thickness: 60 micron) the dispersion of NC-G[#3] in polyvinyl alcohol solution (solid ratio: 1/5) was coated at a rate of 1 g/m². On the resultant paper the mixture of the above microcapsule and Sumika Flex 830 (solid ratio: 5/1) was coated at a rate of 60 g/m² and then adhesives (Nikasol TS444) were coated at a rate of 30 g/m² to make a label, on which a load of 20–100 kg/cm² was applied and it was kept at −18° C. for one week, but any change in color was not observed. At −15° C. the change began after one hour and completely discolored in 5 hours.

EXAMPLE 27

Methyl myristate (20 g), methyl methacrylate (10 g) and AIBN (50 mg) were mixed and dispersed in 0.5 wt. % aqueous solution of methyl cellulose to form a fine droplet. The reaction mixture was treated at 75° C. for 5 hours to give a desired microcapsule. The dispersion obtained by dispersing active clay and CVL in an aqueous solution of polyvinyl alcohol (10:1:2) was coated on the surface of a fine quality paper (55 g/m²) at a rate of 5 g/m². On the back surface of the paper the mixed ink of the above capsule and Sumika Flex 830 (solid ratio: 5/1) was coated at a rate of 60 g/m². After a load of 20–100 kg/cm² was applied, the label was kept at 10° C. for one week, but any change in color was not observed. When the paper was raised to 13° C., it began to change to blue in 3 hours, and was saturated in 8 hours.

EXAMPLE 28

According to Example 27 excepting coating the dispersion of CVL/nonylphenol/polyvinyl alcohol (10/1/2) as an ink at a rate of 5 g/m², instead of the dispersion of Example 27, a surface-coated paper was prepared. The surface coated paper was heated in 150° C. oven for 15 minutes to change the color to blue. On the back surface of the blue paper the mixture of the microcapsule and Sumika Flex 830 was coated as in Example 27 to give a blue label. After a load of 20–100 kg/cm² was applied to the label, it was kept at 10° C. for one week, but any change in color was not observed. Raising the temperature to 13° C., the color began to fade after 3 hours, and at last completely discolored in 8 hours.

EXAMPLE 29

According to Example 27 excepting using lauryl alcohol (20 g), methyl methacrylate (10 g) and AIBN (50 mg) a microcapsule was prepared. The microcapsule was mixed with Sumika Flex 830 (solid ratio: 1/1) to prepare an ink, which was coated on paper as described in Example 27 to give a label. A load of 20–100 kg/cm² was applied to the label, which was kept at 5° C. for one week, but any change in color was not observed. Raising temperature to 8° C., the change began in one hour and completely discolored in 5 hours.

EXAMPLE 30

A microcapsule was prepared according to similar manner to Example 27 using pentadecane (20 g), methyl methacrylate (10 g) and AIBN (50 mg). An ink was prepared by mixing the microcapsule and Sumika Flex 830 (solid ratio: 5/1). A label was prepared by the coat of the surface and the back surface of the paper under the same condition as in the Example 27, to which a load of 20–100 kg/m² was applied and it was kept at 0° C. for one week, but color change did not occurred. Raising the temperature to 3° C., the color began to change in one hour and completely discolored in additional 5 hours.

EXAMPLE 31

A microcapsule was prepared in a similar manner to described in Example 27 using resorcin monomethyl ether (20 g), methyl methacrylate (10 g) and AIBN (50 mg), and an ink composition was prepared using the microcapsule and Sumika Flex 830 (solid ratio: 5/1). According to Example 27 a label was prepared, to which a load of 20–100 kg/cm² was applied, and it was kept at −18° C. for one week, but any color change was not observed. Raising it to −15° C., the change began in 3 hours and completely discolored in 8 hours.

EXAMPLE 32

On the back surface of the blue paper obtained in Example 28 the microcapsule of Example 29 was coated and treated with adhesives to give a label. To the label a load 20–100 kg/cm² was applied and the label was kept at 5° C. for one week, but any change in color was not observed. At 8° C. the color began to fade in 3 hours and completely discolored in 8 hours.

EXAMPLE 33

According to Example 27 CVL/nonylphenol/-polyvinyl alcohol was coated on a fine quality paper and colored. On the back surface of the paper the microcapsule of Example 31 was coated to make an adhesive-treated label. After a load of 20–100 kg/cm$^2$ was applied to the label to break the microcapsule, it was kept at −18° C. for one week. Any change in color was not observed after the treatment, but raising the temperature to −15° C., the label began to fade in 3 hours and completely faded in 8 hours.

What is claimed is:

1. A temperature-indicating sheet which contains:
   (i) an organic electron-donative color precursor,
   (ii) a color developing agent which when in contact with said organic electron-donative color precursor results in a change in color, said color developing agent selected from the group consisting of phenolic hydroxyl group-containing compounds, organic carboxylic acids and inorganic solid acids,
   (iii) a waxy substance selected from the group consisting of alcohol, ester, hydrocarbon, ether and ketone, which melts at a prescribed temperature,
   (iv) a binder selected from the group consisting of polyvinyl acetate, vinyl acetate copolymer and acrylic ester copolymer, and
   (v) a paper or non-woven fabric membrane, said waxy substance and color precursor being a mixture included in microcapsules which can be broken by outer pressure at a temperature of use, said microcapsules being adhered to said membrane through said binder at one side of said membrane, said color developing agent being adhered to said membrane at the opposite side, so that when said microcapsules have been broken and said waxy substance is exposed to said prescribed temprataure, said mixture becomes a molten mixture and permeates through said membrane to cause a change of color and provide an indication of the sheet temperature, the weight ratio of said microcapsules to said binder being in the range of from 30:1 to 1:2, and said membrane being permeable at a given rate to the molten mixture, having a base weight of 20–200 g/m$^2$ and the ratio of said base weight to membrane thickness in microns being not less than 0.3.

2. A temperature-indicating sheet which contains:
   (i) an organic electron-donative color precursor,
   (ii) a color developing agent which when in contact with said organic electron-donative color precursor results in a change in color, said color developing agent selected from the group consisting of phenolic hydroxyl group-containing compounds, organic carboxylic acids and inorganic solid acids,
   (iii) a waxy substance selected from the group consisting of alcohol, ester, hydrocarbon, ether and ketone, which melts at a prescribed temperature,
   (iv) a binder selected from the group consisting of polyvinyl acetate, vinyl acetate copolymer and acrylic ester copolymer, and
   (v) a paper or non-woven fabric membrane, said waxy substance and color developing agent being a mixture included in microcapsules which can be broken by outer pressure at a temperature of use, said microcapsules being adhered to said membrane through said binder at one side of the membrane, said color precursor being adhered to said membrane at the opposite side, so that when said microcapsules have been broken and said waxy substance is exposed to said prescribed temperature, said mixture becomes a molten mixture and permeates through said membrane to cause a change of color and provide an indication of the sheet temperature, the weight ratio of said microcapsules to said binder being in the range of from 30:1 to 1:2, and said membrane being permeable at a given rate to the molten mixture, having a base weight of 20–200 g/m$^2$ and the ratio of said base weight to membrane thickness in microns being not less than 0.3.

3. A temperature-indicating sheet which contains:
   (i) an organic electron-donative color precursor,
   (ii) a color developing agent which when in contact with said organic electron-donative color precursor results in a change in color, said color developing agent selected from the group consisting of phenolic hydroxyl group-containing compounds, organic carboxylic acids and inorganic solid acids,
   (iii) a waxy substance selected from the group consisting of alcohol, ester, hydrocarbon, ether and ketone, which melts at a prescribed temperature,
   (iv) a binder selected from the group consisting of polyvinyl acetate, vinyl acetate copolymer and acrylic ester copolymer, and
   (v) a paper or non-woven fabric membrane, said waxy substance included in microcapsules which can be broken by outer pressure at a temperature used, being adhered to said membrane through said binder at one side of said membrane, a mixture of said color precursor (i) and said color developing agent (ii) being adhered to said membrane at the opposite side, so that when said microcapsules have been broken and said waxy substance is exposed to said prescribed temperature, said waxy substance permeates through said membrane to change the color of said mixture and provide an indication of the sheet temperature, the weight ratio of said microcapsules to said binder being in the range of from 30:1 to 1:2, and said membrane being permeable at a given rate to said waxy substance, having a base weight of 20–200 g/m$^2$ and the ratio of said base weight to membrane thickness in microns being not less than 0.3.

* * * * *